(12) United States Patent (10) Patent No.: US 12,597,102 B2
Lei et al. (45) Date of Patent: Apr. 7, 2026

(54) IMAGE ENHANCEMENT IN CHARGED PARTICLE INSPECTION

(71) Applicant: ASML Netherlands B.V., Veldhoven (NL)

(72) Inventors: Hairong Lei, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 63 days.

(21) Appl. No.: 18/557,584

(22) PCT Filed: Apr. 28, 2022

(86) PCT No.: PCT/EP2022/061326
§ 371 (c)(1),
(2) Date: Oct. 26, 2023

(87) PCT Pub. No.: WO2022/229317
PCT Pub. Date: Nov. 3, 2022

(65) Prior Publication Data
US 2025/0095116 A1 Mar. 20, 2025

Related U.S. Application Data

(60) Provisional application No. 63/181,225, filed on Apr. 28, 2021.

(51) Int. Cl.
*G06T 5/70* (2024.01)
*G06T 7/00* (2017.01)

(52) U.S. Cl.
CPC ................ *G06T 5/70* (2024.01); *G06T 7/001* (2013.01); *G06T 2207/20081* (2013.01); *G06T 2207/30148* (2013.01)

(58) Field of Classification Search
CPC ........................................................ G06T 5/70
See application file for complete search history.

(56) References Cited

U.S. PATENT DOCUMENTS

| | | | |
|---|---|---|---|
| 2018/0114096 A1* | 4/2018 | Sen | G06N 3/084 |
| 2018/0260937 A1* | 9/2018 | Gadi | G06T 5/70 |
| 2022/0051093 A1* | 2/2022 | Skaljak | G06T 15/06 |
| 2022/0392019 A1* | 12/2022 | Huang | G06T 1/20 |

OTHER PUBLICATIONS

PCT International Search Report issued in related PCT International Application No. PCT/EP2022/061326; mailed Aug. 25, 2022 (2 pgs.).

(Continued)

*Primary Examiner* — Michael H Hong
(74) *Attorney, Agent, or Firm* — FINNEGAN, HENDERSON, FARABOW, GARRETT & DUNNER, LLP

(57) ABSTRACT

An improved systems and methods for generating a denoised inspection image are disclosed. An improved method for generating a denoised inspection image comprises acquiring an inspection image; generating a first denoised image by executing a first type denoising algorithm on the inspection image; and generating a second denoised image by executing a second type denoising algorithm on the first denoised image.

13 Claims, 10 Drawing Sheets

<u>100</u>

(56) References Cited

OTHER PUBLICATIONS

Saikia et al., "Multilevel-DWT based image de-noising using feed forward artificial neural network," 2014 International Conference on Signal Processing and Integrated Networks (SPIN), 2014, pp. 791-794, doi: 10.1109/SPIN.2014.6777062. (4 pages).

Noor, et al. "Median filters combined with denoising convolutional neural network for Gaussian and impulse noises." Multimedia Tools Appl 79, 18553-18568 (2020). https://doi.org/10.1007/s11042-020-08657-4 (16 pages).

Yang Xuhui et al., "Image Denoising via Sequential Ensemble Learning" IEEE Transactions on Image processing, vol. 29, 2020, Mar. 11, 202 (12 pages).

Zamir Syed et al., "CycleISP: Real Image Restoration via Improved Data Synthesis" 2020 IEEE/CVF Conference on CVPR, Jun. 13, 2020 (10 pages).

* cited by examiner

<u>100</u>

300

401
σ: 2.047

402
σ: 1.424

403
σ: 1.011

404
σ: 0.700

420
σ: 0.357

430
σ: 0.034

441
σ: 0.147

442
σ: 0.118

443
σ: 0.103

444
σ: 0.093

451
σ: 0.119

452
σ: 0.096

453
σ: 0.084

454
σ: 0.078

500

621
σ: 0.152

622
σ: 0.127

623
σ: 0.110

624
σ: 0.103

641
σ: 0.020

642
σ: 0.015

643
σ: 0.012

644
σ: 0.011

IMAGE ENHANCEMENT IN CHARGED PARTICLE INSPECTION

CROSS-REFERENCE TO RELATED APPLICATIONS

This application claims priority of International Application No. PCT/EP2022/061326, filed 28 Apr. 2022, which claims priority of U.S. application 63/181,225, which was filed on 28 Apr. 2021 The contents of these applications are incorporated herein by reference in their entireties.

TECHNICAL FIELD

The embodiments provided herein relate to an image enhancement technology, and more particularly to a cascade denoising mechanism for a charged-particle beam inspection image.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important. During a defect inspection process, inspection images such as SEM images can be used to identify or classify a defect(s) of the manufactured ICs. To improve defect detection performance, obtaining a clean SEM image without noise is desired.

SUMMARY

The embodiments provided herein disclose a particle beam inspection apparatus, and more particularly, an inspection apparatus using a plurality of charged particle beams.

In some embodiments, a method for generating a denoised inspection image is provided. The method comprises acquiring an inspection image; generating a first denoised image by executing a first type denoising algorithm on the inspection image; and generating a second denoised image by executing a second type denoising algorithm on the first denoised image.

In some embodiments, an apparatus for generating a denoised inspection image is provided. The apparatus comprises a memory storing a set of instructions; and at least one processor configured to execute the set of instructions to cause the apparatus to perform: acquiring an inspection image; generating a first denoised image by executing a first type denoising algorithm on the inspection image; and generating a second denoised image by executing a second type denoising algorithm on the first denoised image.

In some embodiments, a non-transitory computer readable medium that stores a set of instructions that is executable by at least on processor of a computing device to cause the computing device to perform a method for generating a denoised inspection image is provided. The method comprises acquiring an inspection image; generating a first denoised image by executing a first type denoising algorithm on the inspection image; and generating a second denoised image by executing a second type denoising algorithm on the first denoised image.

In some embodiments, a method for training a denoising model is provided. The method comprises acquiring a training image of a pattern and a reference image of the pattern; generating a denoised reference image by executing a non-ML based denoising algorithm on the reference image; and training a denoising model to predict a denoised image of the training image based on the denoised reference image.

In some embodiments, an apparatus for training a denoising model is provided. The apparatus comprises a memory storing a set of instructions; and at least one processor configured to execute the set of instructions to cause the apparatus to perform: acquiring a training image of a pattern and a reference image of the pattern; generating a denoised reference image by executing a non-ML based denoising algorithm on the reference image; and training a denoising model to predict a denoised image of the training image based on the denoised reference image.

In some embodiments, a non-transitory computer readable medium that stores a set of instructions that is executable by at least on processor of a computing device to cause the computing device to perform a method for training a denoising model is provided. The method comprises acquiring a training image of a pattern and a reference image of the pattern; generating a denoised reference image by executing a non-ML based denoising algorithm on the reference image; and training a denoising model to predict a denoised image of the training image based on the denoised reference image.

Other advantages of the embodiments of the present disclosure will become apparent from the following description taken in conjunction with the accompanying drawings wherein are set forth, by way of illustration and example, certain embodiments of the present invention.

BRIEF DESCRIPTION OF FIGURES

The above and other aspects of the present disclosure will become more apparent from the description of exemplary embodiments, taken in conjunction with the accompanying drawings.

DETAILED DESCRIPTION

Figure 1:
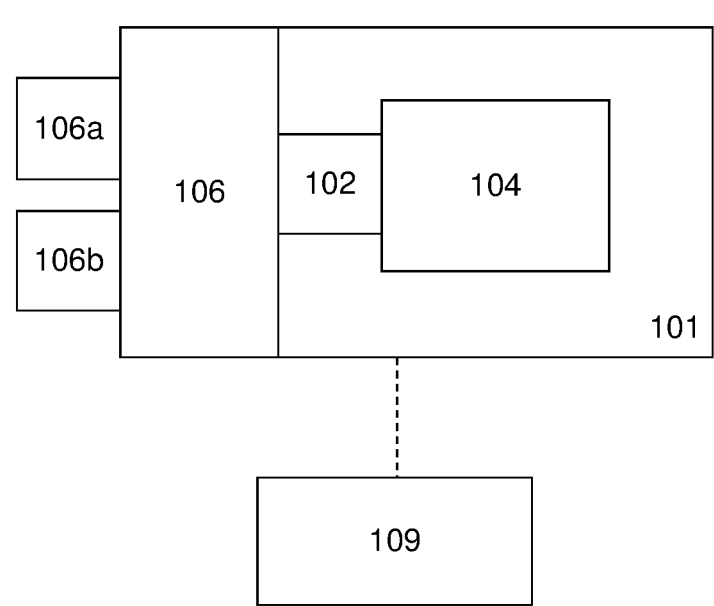
FIG. 1 is a schematic diagram illustrating an example charged-particle beam inspection system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of semiconductor material called a substrate. The semiconductor material may include, for example, silicon, gallium arsenide, indium phosphide, or silicon germanium, or the like. Many circuits may be formed together on the same piece of silicon and are called integrated circuits or ICs. The size of these circuits has decreased dramatically so that many more of them can be fit on the substrate. For example, an IC chip in a smartphone can be as small as a thumbnail and yet may include over 2 billion transistors, the size of each transistor being less than $1/1000$th the size of a human hair.

Making these ICs with extremely small structures or components is a complex, time-consuming, and expensive process, often involving hundreds of individual steps. Errors in even one step have the potential to result in defects in the finished IC, rendering it useless. Thus, one goal of the manufacturing process is to avoid such defects to maximize the number of functional ICs made in the process; that is, to improve the overall yield of the process.

One component of improving yield is monitoring the chip-making process to ensure that it is producing a sufficient number of functional integrated circuits. One way to monitor the process is to inspect the chip circuit structures at various stages of their formation. Inspection can be carried out using a scanning charged-particle microscope (SCPM). For example, an SCPM may be a scanning electron microscope (SEM). A SCPM can be used to image these extremely small structures, in effect, taking a "picture" of the structures of the wafer. The image can be used to determine if the structure was formed properly in the proper location. If the structure is defective, then the process can be adjusted, so the defect is less likely to recur.

As the physical sizes of IC components continue to shrink, accuracy and yield in defect detection become more important. During a defect inspection process, inspection images, such as SEM images, may be used to identify or classify a defect(s) on the manufactured ICs. To improve defect detection performance, obtaining a clean SEM image without noise is desired. While various denoising algorithms including machine learning or deep learning techniques have been introduced, none of them has showed sufficient denoising performance on SEM images. Further, in order for machine learning or deep learning models to predict a denoised SEM image, the models may be trained with training images. However, it is challenging to train machine learning or deep learning models to accurately predict a denoised SEM image due to a lack of a ground truth image, i.e., a clean SEM image without noise.

Embodiments of the disclosure may provide a cascade denoising technique to denoise SEM images. According to some embodiments of the present disclosure, a denoised SEM image can be obtained by sequentially applying different types of denoising algorithms on a SEM image. According to some embodiments of the present disclosure, a denoised SEM image can be obtained by applying a machine learning based denoising algorithm and a non-machine learning based denoising algorithm on a SEM image in order. Embodiments of the disclosure may provide a technique for training a machine learning based denoising algorithm. According to some embodiments of the present disclosure, a denoised reference image that is obtained by applying a non-machine learning based denoising algorithm on a reference image can be used as a ground truth image when training a machine learning based denoising algorithm.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

FIG. 1 illustrates an example electron beam inspection (EBI) system 100 consistent with embodiments of the present disclosure. EBI system 100 may be used for imaging. As shown in FIG. 1, EBI system 100 includes a main chamber 101, a load/lock chamber 102, a beam tool 104, and an equipment front end module (EFEM) 106. Beam tool 104 is located within main chamber 101. EFEM 106 includes a first loading port 106a and a second loading port 106b. EFEM 106 may include additional loading port(s). First loading port 106a and second loading port 106b receive wafer front opening unified pods (FOUPs) that contain wafers (e.g., semiconductor wafers or wafers made of other material(s)) or samples to be inspected (wafers and samples may be used interchangeably). A "lot" is a plurality of wafers that may be loaded for processing as a batch.

One or more robotic arms (not shown) in EFEM 106 may transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robotic arms (not shown) may transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by beam tool 104. Beam tool 104 may be a single-beam system or a multi-beam system.

A controller 109 is electronically connected to beam tool 104. Controller 109 may be a computer configured to execute various controls of EBI system 100. While controller 109 is shown in FIG. 1 as being outside of the structure that includes main chamber 101, load/lock chamber 102, and EFEM 106, it is appreciated that controller 109 may be a part of the structure.

In some embodiments, controller 109 may include one or more processors (not shown). A processor may be a generic or specific electronic device capable of manipulating or processing information. For example, the processor may include any combination of any number of a central processing unit (or "CPU"), a graphics processing unit (or "GPU"), an optical processor, a programmable logic controllers, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), and any type circuit capable of data processing. The processor may also be a virtual processor that includes one or more processors distributed across multiple machines or devices coupled via a network.

In some embodiments, controller 109 may further include one or more memories (not shown). A memory may be a generic or specific electronic device capable of storing codes and data accessible by the processor (e.g., via a bus). For example, the memory may include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or any type of storage device. The codes and data may include an operating system (OS) and one or more application programs (or "apps") for specific tasks. The memory may also be a virtual memory that includes one or more memories distributed across multiple machines or devices coupled via a network.

Figure 2:
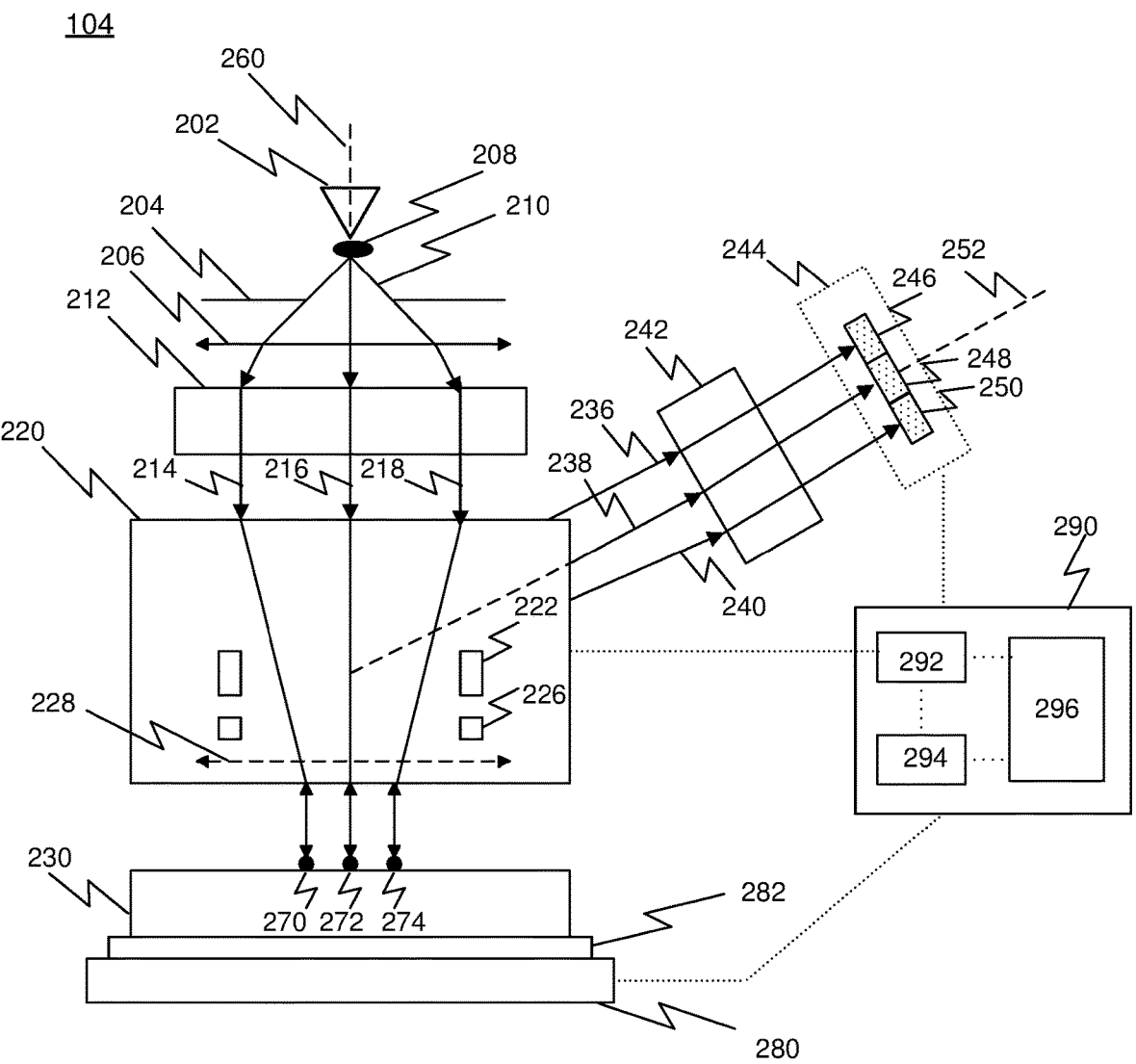
FIG. 2 is a schematic diagram illustrating an example multi-beam tool that can be a part of the example charged-particle beam inspection system of FIG. 1, consistent with embodiments of the present disclosure.

FIG. 2 illustrates a schematic diagram of an example multi-beam tool 104 (also referred to herein as apparatus 104) and an image processing system 290 that may be configured for use in EBI system 100 (FIG. 1), consistent with embodiments of the present disclosure.

Beam tool 104 comprises a charged-particle source 202, a gun aperture 204, a condenser lens 206, a primary charged-particle beam 210 emitted from charged-particle source 202, a source conversion unit 212, a plurality of beamlets 214, 216, and 218 of primary charged-particle beam 210, a primary projection optical system 220, a motorized wafer stage 280, a wafer holder 282, multiple secondary charged-particle beams 236, 238, and 240, a secondary optical system 242, and a charged-particle detection device 244. Primary projection optical system 220 can comprise a beam separator 222, a deflection scanning unit 226, and an objective lens 228. Charged-particle detection device 244 can comprise detection sub-regions 246, 248, and 250.

Charged-particle source 202, gun aperture 204, condenser lens 206, source conversion unit 212, beam separator 222, deflection scanning unit 226, and objective lens 228 can be aligned with a primary optical axis 260 of apparatus 104. Secondary optical system 242 and charged-particle detection device 244 can be aligned with a secondary optical axis 252 of apparatus 104.

Charged-particle source 202 can emit one or more charged particles, such as electrons, protons, ions, muons, or any other particle carrying electric charges. In some embodiments, charged-particle source 202 may be an electron source. For example, charged-particle source 202 may include a cathode, an extractor, or an anode, wherein primary electrons can be emitted from the cathode and extracted or accelerated to form primary charged-particle beam 210 (in this case, a primary electron beam) with a crossover (virtual or real) 208. For ease of explanation without causing ambiguity, electrons are used as examples in some of the descriptions herein. However, it should be noted that any charged particle may be used in any embodiment of this disclosure, not limited to electrons. Primary charged-particle beam 210 can be visualized as being emitted from crossover 208. Gun aperture 204 can block off peripheral charged particles of primary charged-particle beam 210 to reduce Coulomb effect. The Coulomb effect may cause an increase in size of probe spots.

Source conversion unit 212 can comprise an array of image-forming elements and an array of beam-limit apertures. The array of image-forming elements can comprise an array of micro-deflectors or micro-lenses. The array of image-forming elements can form a plurality of parallel images (virtual or real) of crossover 208 with a plurality of beamlets 214, 216, and 218 of primary charged-particle beam 210. The array of beam-limit apertures can limit the plurality of beamlets 214, 216, and 218. While three beamlets 214, 216, and 218 are shown in FIG. 2, embodiments of the present disclosure are not so limited. For example, in some embodiments, the apparatus 104 may be configured to generate a first number of beamlets. In some embodiments, the first number of beamlets may be in a range from 1 to 1000. In some embodiments, the first number of beamlets may be in a range from 200-500. In an exemplary embodiment, an apparatus 104 may generate 400 beamlets.

Condenser lens 206 can focus primary charged-particle beam 210. The electric currents of beamlets 214, 216, and 218 downstream of source conversion unit 212 can be varied by adjusting the focusing power of condenser lens 206 or by changing the radial sizes of the corresponding beam-limit apertures within the array of beam-limit apertures. Objective lens 228 can focus beamlets 214, 216, and 218 onto a wafer 230 for imaging, and can form a plurality of probe spots 270, 272, and 274 on a surface of wafer 230.

Beam separator 222 can be a beam separator of Wien filter type generating an electrostatic dipole field and a magnetic dipole field. In some embodiments, if they are applied, the force exerted by the electrostatic dipole field on a charged particle (e.g., an electron) of beamlets 214, 216, and 218 can be substantially equal in magnitude and opposite in a direction to the force exerted on the charged particle by magnetic dipole field. Beamlets 214, 216, and 218 can, therefore, pass straight through beam separator 222 with zero deflection angle. However, the total dispersion of beamlets 214, 216, and 218 generated by beam separator 222 can also be non-zero. Beam separator 222 can separate secondary charged-particle beams 236, 238, and 240 from beamlets 214, 216, and 218 and direct secondary charged-particle beams 236, 238, and 240 towards secondary optical system 242.

Deflection scanning unit 226 can deflect beamlets 214, 216, and 218 to scan probe spots 270, 272, and 274 over a surface area of wafer 230. In response to the incidence of beamlets 214, 216, and 218 at probe spots 270, 272, and 274, secondary charged-particle beams 236, 238, and 240 may be emitted from wafer 230. Secondary charged-particle beams 236, 238, and 240 may comprise charged particles (e.g., electrons) with a distribution of energies. For example, secondary charged-particle beams 236, 238, and 240 may be secondary electron beams including secondary electrons (energies ≤50 eV) and backscattered electrons (energies between 50 eV and landing energies of beamlets 214, 216, and 218). Secondary optical system 242 can focus secondary charged-particle beams 236, 238, and 240 onto detection sub-regions 246, 248, and 250 of charged-particle detection device 244. Detection sub-regions 246, 248, and 250 may be configured to detect corresponding secondary charged-particle beams 236, 238, and 240 and generate corresponding signals (e.g., voltage, current, or the like) used to reconstruct an SCPM image of structures on or underneath the surface area of wafer 230.

The generated signals may represent intensities of secondary charged-particle beams 236, 238, and 240 and may be provided to image processing system 290 that is in communication with charged-particle detection device 244, primary projection optical system 220, and motorized wafer stage 280. The movement speed of motorized wafer stage 280 may be synchronized and coordinated with the beam deflections controlled by deflection scanning unit 226, such that the movement of the scan probe spots (e.g., scan probe spots 270, 272, and 274) may orderly cover regions of interests on the wafer 230. The parameters of such synchronization and coordination may be adjusted to adapt to different materials of wafer 230. For example, different materials of wafer 230 may have different resistance-capacitance characteristics that may cause different signal sensitivities to the movement of the scan probe spots.

The intensity of secondary charged-particle beams 236, 238, and 240 may vary according to the external or internal structure of wafer 230, and thus may indicate whether wafer 230 includes defects. Moreover, as discussed above, beamlets 214, 216, and 218 may be projected onto different locations of the top surface of wafer 230, or different sides of local structures of wafer 230, to generate secondary charged-particle beams 236, 238, and 240 that may have different intensities. Therefore, by mapping the intensity of secondary charged-particle beams 236, 238, and 240 with the areas of wafer 230, image processing system 290 may reconstruct an image that reflects the characteristics of internal or external structures of wafer 230.

In some embodiments, image processing system 290 may include an image acquirer 292, a storage 294, and a controller 296. Image acquirer 292 may comprise one or more processors. For example, image acquirer 292 may comprise a computer, server, mainframe host, terminals, personal computer, any kind of mobile computing devices, or the like, or a combination thereof. Image acquirer 292 may be communicatively coupled to charged-particle detection device 244 of beam tool 104 through a medium such as an electric conductor, optical fiber cable, portable storage media, IR, Bluetooth, internet, wireless network, wireless radio, or a combination thereof. In some embodiments, image acquirer 292 may receive a signal from charged-particle detection device 244 and may construct an image. Image acquirer 292 may thus acquire SCPM images of wafer 230. Image acquirer 292 may also perform various post-processing functions, such as generating contours, superimposing indicators on an acquired image, or the like. Image acquirer 292 may be configured to perform adjustments of brightness and contrast of acquired images. In some embodiments, storage 294 may be a storage medium such as a hard disk, flash drive, cloud storage, random access memory (RAM), other types of computer-readable memory, or the like. Storage 294 may be coupled with image acquirer 292 and may be used for saving scanned raw image data as original images, and post-processed images. Image acquirer 292 and storage 294 may be connected to controller 296. In some embodiments, image acquirer 292, storage 294, and controller 296 may be integrated together as one control unit.

In some embodiments, image acquirer 292 may acquire one or more SCPM images of a wafer based on an imaging signal received from charged-particle detection device 244. An imaging signal may correspond to a scanning operation for conducting charged particle imaging. An acquired image may be a single image comprising a plurality of imaging areas. The single image may be stored in storage 294. The single image may be an original image that may be divided into a plurality of regions. Each of the regions may comprise one imaging area containing a feature of wafer 230. The acquired images may comprise multiple images of a single imaging area of wafer 230 sampled multiple times over a time sequence. The multiple images may be stored in storage 294. In some embodiments, image processing system 290 may be configured to perform image processing steps with the multiple images of the same location of wafer 230.

In some embodiments, image processing system 290 may include measurement circuits (e.g., analog-to-digital converters) to obtain a distribution of the detected secondary charged particles (e.g., secondary electrons). The charged-particle distribution data collected during a detection time window, in combination with corresponding scan path data of beamlets 214, 216, and 218 incident on the wafer surface, can be used to reconstruct images of the wafer structures under inspection. The reconstructed images can be used to reveal various features of the internal or external structures of wafer 230, and thereby can be used to reveal any defects that may exist in the wafer.

In some embodiments, the charged particles may be electrons. When electrons of primary charged-particle beam 210 are projected onto a surface of wafer 230 (e.g., probe spots 270, 272, and 274), the electrons of primary charged-particle beam 210 may penetrate the surface of wafer 230 for a certain depth, interacting with particles of wafer 230. Some electrons of primary charged-particle beam 210 may elastically interact with (e.g., in the form of elastic scattering or collision) the materials of wafer 230 and may be reflected or recoiled out of the surface of wafer 230. An elastic interaction conserves the total kinetic energies of the bodies (e.g., electrons of primary charged-particle beam 210) of the interaction, in which the kinetic energy of the interacting bodies does not convert to other forms of energy (e.g., heat, electromagnetic energy, or the like). Such reflected electrons generated from elastic interaction may be referred to as backscattered electrons (BSEs). Some electrons of primary charged-particle beam 210 may inelastically interact with (e.g., in the form of inelastic scattering or collision) the materials of wafer 230. An inelastic interaction does not conserve the total kinetic energies of the bodies of the interaction, in which some or all of the kinetic energy of the interacting bodies convert to other forms of energy. For example, through the inelastic interaction, the kinetic energy of some electrons of primary charged-particle beam 210 may cause electron excitation and transition of atoms of the materials. Such inelastic interaction may also generate electrons exiting the surface of wafer 230, which may be referred to as secondary electrons (SEs). Yield or emission rates of BSEs and SEs depend on, e.g., the material under inspection and the landing energy of the electrons of primary charged-particle beam 210 landing on the surface of the material, among others. The energy of the electrons of primary charged-particle beam 210 may be imparted in part by its acceleration voltage (e.g., the acceleration voltage between the anode and cathode of charged-particle source 202 in FIG. 2). The quantity of BSEs and SEs may be more or fewer (or even the same) than the injected electrons of primary charged-particle beam 210.

The images generated by SEM may be used for defect inspection. For example, a generated image capturing a test device region of a wafer may be compared with a reference image capturing the same test device region. The reference image may be predetermined (e.g., by simulation) and include no known defect. If a difference between the generated image and the reference image exceeds a tolerance level, a potential defect may be identified. For another example, the SEM may scan multiple regions of the wafer, each region including a test device region designed as the same, and generate multiple images capturing those test device regions as manufactured. The multiple images may be compared with each other. If a difference between the multiple images exceeds a tolerance level, a potential defect may be identified.

Figure 3:
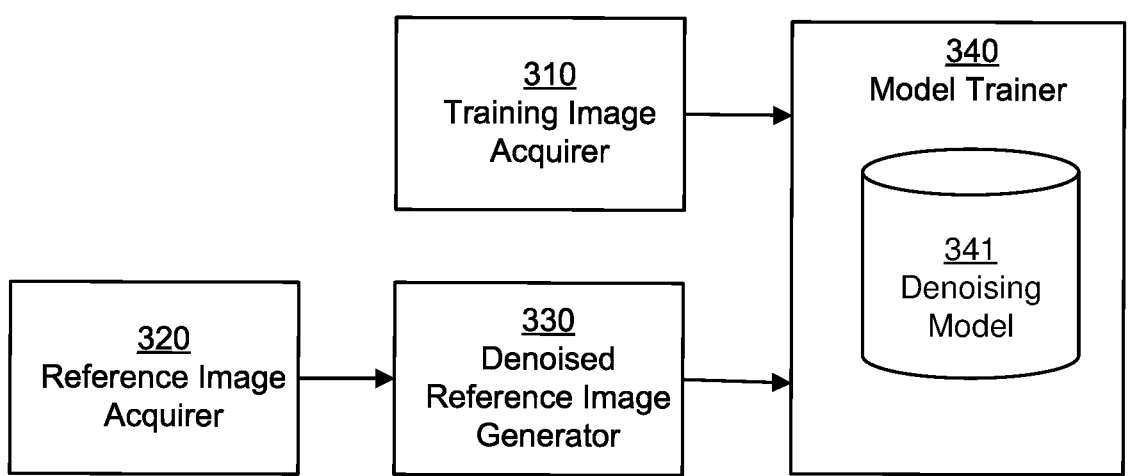
FIG. 3 is a block diagram of an example training system for inspection image denoising, consistent with embodiments of the present disclosure.

Reference is now made to FIG. 3, which is a block diagram of an example training system for inspection image denoising, consistent with embodiments of the present disclosure. In some embodiments, a training system 300 comprises one or more processors and memories. It is appreciated that in various embodiments training system 300 may be part of or may be separate from a charged-particle beam inspection system (e.g., EBI system 100 of FIG. 1), or computational lithography system, or other photolithography systems. In some embodiments, training system 300 may include one or more components (e.g., software modules) that can be implemented in controller 109 or system 290 as discussed herein.

As shown in FIG. 3, training system 300 may comprise a training image acquirer 310, a reference image acquirer 320, a denoised reference image generator 330, and a model trainer 340.

According to some embodiments of the present disclosure, training image acquirer 310 can acquire multiple training images. In some embodiments, a training image can be an inspection image obtained by a charged-particle beam inspection system (e.g., electron beam inspection system 100 of FIG. 1). For example, an inspection image can be an electron beam image generated based on a detection signal from electron detection device 244 of electron beam tool 104. In some embodiments, training image acquirer 310 may obtain an inspection image from a storage device or system storing the inspection image.

Figure 4A:
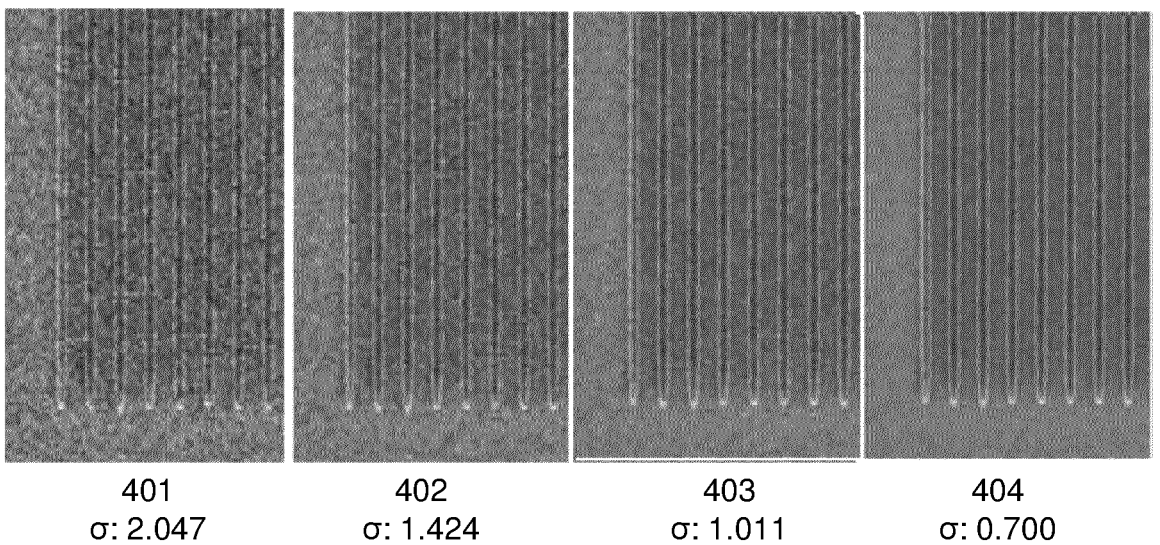
FIG. 4A illustrates example inspection images, consistent with embodiments of the present disclosure.

In some embodiments, training image acquirer 310 may acquire one or more inspection images for a pattern of a sample (or wafer) as training images. In some embodiments, inspection images that have been taken for a same pattern and have different noise levels can be used as training images. FIG. 4A illustrates example inspection images that can be used as training images, consistent with embodiments of the present disclosure. First to fourth inspection images 401 to 404 shown in FIG. 4A are inspection images obtained for a same pattern and having different noise levels. Generally, an inspection image with less noise can be obtained by scanning a pattern multiple times and by averaging multiple signals obtained by multiple times of scanning.

Under x time frame average, a primary beam may scan each frame corresponding to a field of view (FOV) on a sample x times and a signal of each pixel may be obtained by averaging x number of signals obtained during x times of frame scanning. As the number x increases, the resultant inspection image by x time frame average gets cleaner. Therefore, multiple inspection images having different noise levels can be obtained by changing average settings when taking inspection images for a pattern. In some embodiments, first to fourth inspection images 401 to 404 shown in FIG. 4A can be obtained by using different average settings. For example, first inspection image 401 is an inspection image obtained by using 1-time frame average, second inspection image 402 is an inspection image obtained by using 2-time frame average, third inspection image 403 is an inspection image obtained by using 4-time frame average, and fourth inspection image is an inspection image obtained by using 8-time frame average.

It will be appreciated that a sigma value σ that represents a noise standard deviation can be used to measure a noise level of an image such as an inspection image in the present disclosure. In some embodiments, sigma value σ of an inspection image can be estimated by using a built-in function "estimate_sigma" of programming language PYTHON. It will also be appreciated that sigma value σ of the present disclosure is used to show a noise level ratio between different images or a noise level ratio between, after, and before applying a certain algorithm to one image rather than an exact estimated value. Based on sigma value σ of each inspection image shown in FIG. 4A, it can be interpreted as first inspection image 401 has the highest noise level and fourth inspection image 404 has the lowest noise level. While four inspection images for a pattern are used as training images, it will be appreciated that any number of inspection images for the pattern can be utilized as training images.

Referring back to FIG. 3, according to some embodiments, reference image acquirer 320 can acquirer a reference image. In some embodiments, a reference image can be an inspection image for a same pattern as training images acquired by training image acquirer 310. In some embodiments, a reference image can be the cleanest image among multiple inspection images obtained for a pattern. In some embodiments, a reference image can also be used as training images. For example, the cleanest image, i.e., fourth inspection image 404 can be used as a reference image as well as a training image.

Figure 4B:
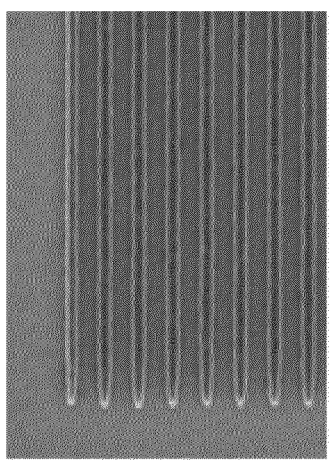
FIG. 4B illustrates an example reference image, consistent with embodiments of the present disclosure.

FIG. 4B illustrates an example reference image, consistent with embodiments of the present disclosure. A reference image 420 shown in FIG. 4B is an inspection image obtained by using 32-time frame average for a same pattern as inspection images 401 to 404 shown in FIG. 4A. As indicated by sigma value σ, reference image 420 has the lowest noise level among inspection images for a pattern including first to fourth inspection images 401 to 404 and reference image 420.

Referring back to FIG. 3, denoised reference image generator 330 can generate a denoised reference image based on a reference image. According to some embodiments, denoised reference image generator 330 can be configured to execute a denoising algorithm on a reference image to generate a denoised reference image. In some embodiments, a denoising algorithm that denoised reference image generator 330 applies can be a non-machine learning based denoising algorithm (non-ML based denoising algorithm). In some embodiments, a non-ML based denoising algorithm can be an algorithm that curbs noise from an image based on mathematical operations on image data. In some embodiments, a non-ML based denoising algorithm may be based on a spatial domal filtering technique, transform domain filtering technique, etc. In some embodiments, a non-ML based denoising algorithm may comprise, but is not limited to, a non-local means (NLM) algorithm, a total variation (TV) denoising algorithm, a block-matching and 3D filtering (BM3D) algorithm, a weighted nuclear norm minimization (WNNM) algorithm, wavelet denoising algorithm, etc.

Figure 4C:
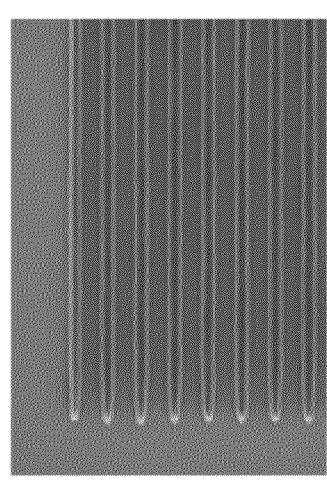
FIG. 4C illustrates an example denoised reference image, consistent with embodiments of the present disclosure.

FIG. 4C illustrates an example denoised reference image, consistent with embodiments of the present disclosure. In some embodiments, a denoised reference image 430 of FIG. 4C can be obtained by applying a non-ML based denoising algorithm on reference image 420 of FIG. 4B. For example, denoised reference image 430 can be obtained by applying a non-local means algorithm on reference image 420. As shown in FIG. 4C, a noise level of denoised reference image 430 is smaller than that of reference image 420 in view of value σ.

While it is illustrated that a denoised reference image is generated by applying a non-ML based denoising algorithm once, it will be appreciated that a denoised reference image can be generated by applying a non-ML based denoising algorithm multiple times on a reference image. In some embodiments, image distortion may occur while a noise level decreases as the iteration number of denoising operations increases. According to some embodiments of the present disclosure, an iteration number of denoising operations on a reference image can be determined by considering a trade-off between image distortion and an image noise level. According to some embodiments of the present disclosure, an iteration number of denoising operations on a reference image may be determined based on a pattern of the reference image. In some embodiments, an iteration number of denoising operations on a reference image may be limited to two or three times because image distortion may have adverse effects if the iteration number is greater than those.

Referring back to FIG. 3, model trainer 340 is configured to train denoising model 341 to predict a denoised image of an input image. In some embodiments, denoising model 341 can be a machine learning system or neural network such as a convoluted neural network (CNN). It is appreciated that other types of machine learning systems can be utilized. For example, denoising model can be an artificial neural network or a recurrent neural network. The specific choice of neural network can be based on the specific features of an input image to be denoised.

Denoising model 341 can receive a training image as an input image. In some embodiments, denoising model 341 can process a training image and predict a denoised image corresponding to a training image. According to some embodiments of the present disclosure, model trainer 340 is configured to train denoising model 341 under supervised learning. In some embodiments, a denoised reference image generated by denoised reference image generator 330 is provided to model trainer 340. In some embodiments, a denoised reference image can be utilized as a ground truth reference for a training image associated with a same pattern as the denoised reference image when training denoising model 341. For example, denoised reference image 430 can be used as a ground truth reference of denoising model 341 for first to fourth inspection images 401 to 404 because denoised reference image 430 and first to fourth inspection images 401 to 404 are associated with a same pattern.

After model trainer 340 trains denoising model 341 under supervised learning, model trainer 340 can output denoising model 341. In some embodiments, denoising model 341 can be used to predict a denoised image for an input image.

Figure 4D:
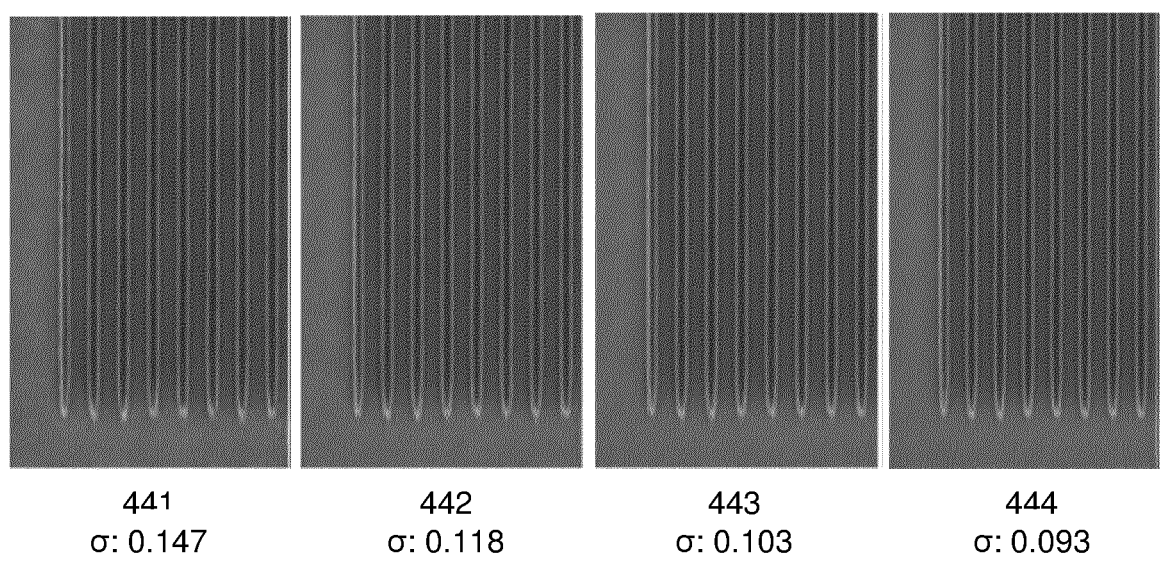
FIG. 4D illustrates example output images of a denoising model trained with a reference image, consistent with embodiments of the present disclosure.

FIG. 4D illustrates example output images of a denoising model trained with a reference image before denoising. FIG. 4D illustrates output images of denoising model 341 where denoising model 341 is trained with reference image 420 of FIG. 4B as a ground truth reference. In FIG. 4D, output images 441 to 444 are output images of denoising model 341 for input inspection images 401 to 404, respectively.

Figure 4E:
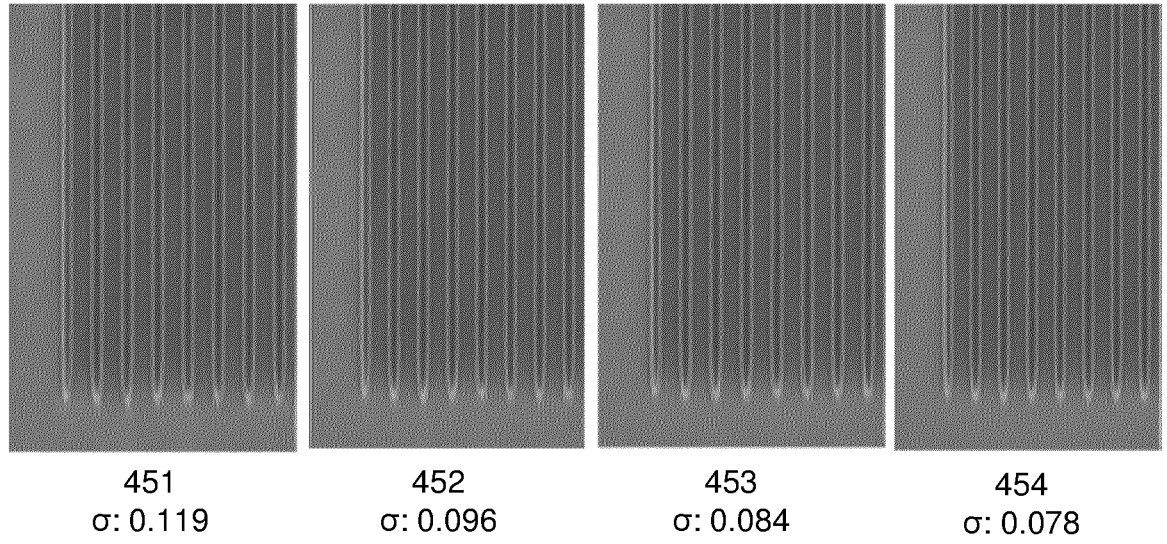
FIG. 4E illustrates example output images of denoising model trained with a denoised reference image, consistent with embodiments of the present disclosure.

FIG. 4E illustrates example output images of a denoising model trained with a denoised reference image. FIG. 4E illustrates output images of denoising model 341 where denoising model 341 is trained with denoised reference image 430 of FIG. 4C as a ground truth reference. In FIG. 4E, output images 451 to 454 are output images of denoising model 341 for input inspection images 401 to 404, respectively. As indicated by sigma values σ shown in FIG. 4D and FIG. 4E, output images 451 to 454 predicted by denoising model 341 trained with denoised reference image 430 have a lower noise level than that of corresponding output images 441 to 444 predicted by denoising model 341 trained with reference image 420 before denoising.

According to some embodiments of the present disclosure, a denoised reference image that has a lower noise level than a reference image can be used as a ground truth reference for training denoising model 341 and thereby denoising performance of denoising model 341 can be improved. While one set of training images and a denoised reference image for a pattern is illustrated in training a denoising model, it will be appreciated that a denoising model can be trained with multiple sets of training images and a denoised reference image.

Figure 5:
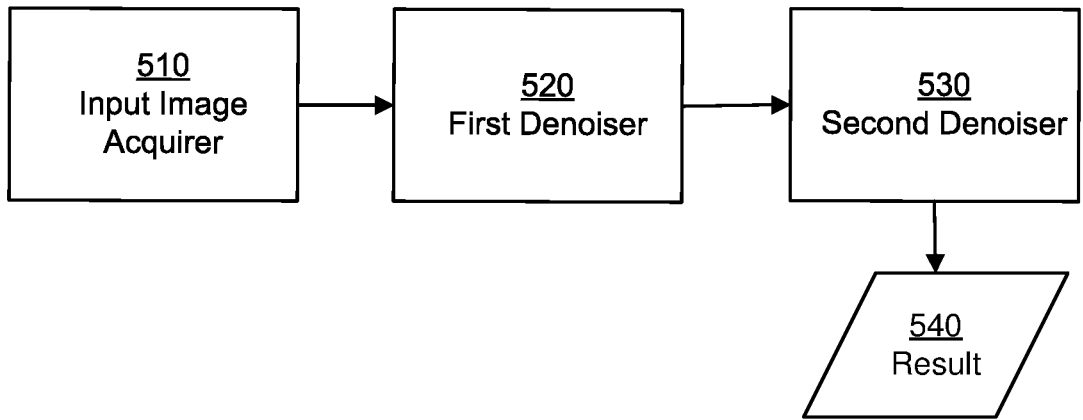
FIG. 5 illustrates a block diagram of an example denoising system, consistent with embodiments of the present disclosure.

Reference is now made to FIG. 5, which is a block diagram of an example denoising system, consistent with embodiments of the present disclosure. In some embodiments, a denoising system 500 comprises one or more processors and memories. It is appreciated that in various embodiments denoising system 500 may be part of or may be separate from a charged-particle beam inspection system (e.g., EBI system 100 of FIG. 1), or computational lithography system, or other photolithography systems. In some embodiments, denoising system 500 may include one or more components (e.g., software modules) that can be implemented in controller 109 or system 290 as discussed herein. In some embodiments, denoising system 500 and training system 300 can be implemented on separate computing devices or on a same computing device.

As shown in FIG. 5, denoising system 500 may comprise an input image acquirer 510, a first denoiser 520, and a second denoiser 530.

According to some embodiments of the present disclosure, input image acquirer 510 can acquire an inspection image as an input image. In some embodiments, an inspection image is a SEM image of a sample or a wafer. In some embodiments, an input inspection image can be an inspection image generated by, e.g., EBI system 100 of FIG. 1 or electron beam tool 104 of FIG. 2. In some embodiments, input image acquirer 510 may obtain an inspection image from a storage device or system storing the inspection image. In the present disclosure, some embodiments will be discussed by using inspection images 401 to 404 of FIG. 4A as input inspection images for illustration purposes.

According to some embodiments of the present disclosure, first denoiser 520 is configured to execute a first type denoising algorithm on an input inspection image to generate a first denoised image. In some embodiments, a first type denoising algorithm utilized in in first denoiser 520 can be a machine learning based denoising algorithm (ML based denoising algorithm). In some embodiments, a first type denoising algorithm can be a machine learning model that is trained using supervised, semi-supervised, or unsupervised machine learning. In some embodiments, a machine learning model employed in first denoiser 520 can be trained to predict a denoised image of an input inspection image. For example, a machine learning model employed in first denoiser 520 can predict a clean image without noise corresponding to an input inspection image. In some embodiments, a machine learning model can be trained to predict a denoised image of an input image based on hand craft features such as brightness, coordinate, etc. In some embodiments, a machine learning model can be a boosting algorithm, a multilayer perceptron (MLP) algorithm, a trainable nonlinear reaction diffusion (TNRD) algorithm, a denoising convolutional neural network (DnCNN), a very deep residual encoder-decoder (RED) network, etc. In some embodiments, a machine learning model can be trained to predict a denoised image of an input image by automatic feature learning without aid of hand craft features.

According to some embodiments of the present disclosure, second denoiser 530 is configured to execute a second type denoising algorithm on a first denoised image to generate a second denoised image. According to some embodiments, a second type denoising algorithm utilized in second denoiser 530 can be different from a first type denoising algorithm utilized in first denoiser 520. In some embodiments, a second type denoising algorithm employed in second denoiser 530 can be a non-machine learning based denoising algorithm (non-ML based denoising algorithm). In some embodiments, a non-ML based denoising algorithm can be an algorithm that curbs noise from an image based on mathematical operations on image data. In some embodiments, a non-ML based denoising algorithm may be based on a spatial domal filtering technique, transform domain filtering technique, etc. In some embodiments, a non-ML based denoising algorithm may comprise, but is not limited to, a non-local means (NLM) algorithm, a total variation (TV) denoising algorithm, a block-matching and 3D filtering (BM3D) algorithm, a weighted nuclear norm minimization (WNNM) algorithm, wavelet denoising algorithm, etc.

As shown in FIG. 5, a resultant denoised image 540 is outputted by second denoiser 530 as a result. In some embodiments, denoised image 540 can be used for defect inspection, defect classification, etc.

Figure 6A:
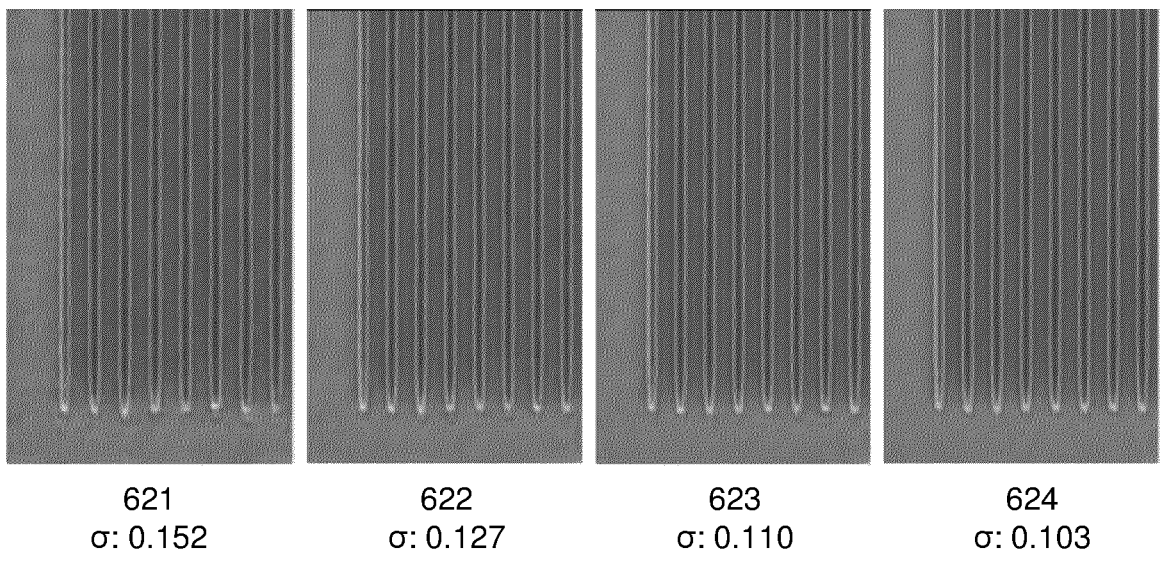
FIG. 6A illustrates example first denoised images after a first denoiser, consistent with embodiments of the present disclosure.
Figure 6B:
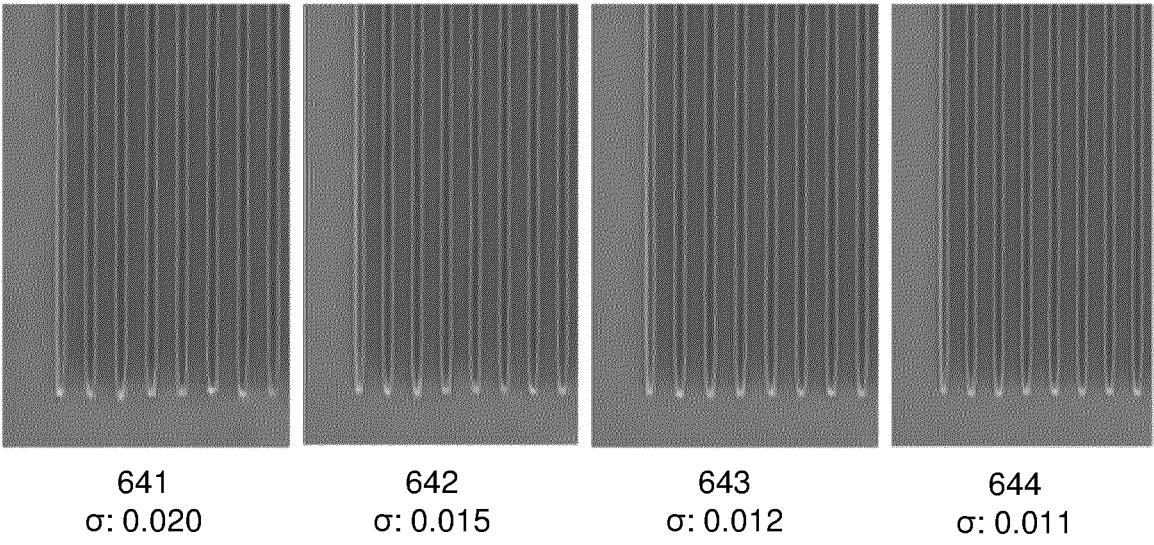
FIG. 6B illustrates example second denoised images after a second denoiser, consistent with embodiments of the present disclosure.

FIG. 6A illustrates example first denoised images after first denoiser 520, consistent with embodiments of the present disclosure. FIG. 6A illustrates output images 621 to 624 of first denoiser 520 for input inspection images 401 to 404, respectively. FIG. 6B illustrates example second denoised images after second denoiser 530, consistent with embodiments of the present disclosure. FIG. 6B illustrates output images 641 to 644 of second denoiser 530 for output images 621 to 624 of first denoiser 520, respectively. As indicated by sigma values σ shown in FIG. 6A and FIG. 6B, output images 641 to 644 that have gone through both of first denoiser 520 and second denoiser 530 have a lower noise level than that of corresponding output images 621 to 624 that have gone through first denoiser 520. It will be appreciated that denoising performance can be improved by using two different types of denoising algorithms sequentially on an input inspection image. In some embodiments, a ML based denoising algorithm may have better denoising performance on a relatively noisy image than a non-ML based denoising algorithm, and therefore denoising performance can be improved by applying a ML based denoising algorithm and a non-ML based denoising algorithm on an inspection image in order. Experiments also show that a combination of a ML based denoising algorithm and a non-ML based denoising algorithm according to some embodiments of the present disclosure have better denoising performance than a ML based denoising algorithm or a non-ML based denoising algorithm alone for some patterns. Experiments also show that a combination of a ML based denoising algorithm and a non-ML based denoising algorithm according to some embodiments of the present disclosure have better denoising performance than two consecutive ML based denoising algorithms or two consecutive non-ML based denoising algorithms for some patterns.

While it is illustrated that a second denoised image is generated by applying a non-ML based denoising algorithm once by second denoiser 530, it will be appreciated that a second denoised image can be generated by applying a non-ML based denoising algorithm multiple times on a first denoised image. In some embodiments, image distortion may occur while a noise level decreases as the iteration number of non-ML based denoising operations increases. According to some embodiments of the present disclosure, an iteration number of non-ML based denoising operations on a reference image can be determined by considering a trade-off between image distortion and an image noise level. According to some embodiments of the present disclosure, an iteration number of non-ML based denoising operations on an inspection image may be determined based on a pattern of the inspection image or an embodiment. In some embodiments, an iteration number of denoising operations on an inspection image may be limited to two or three times because image distortion may have adverse effects if the iteration number is greater than those.

Figure 7:
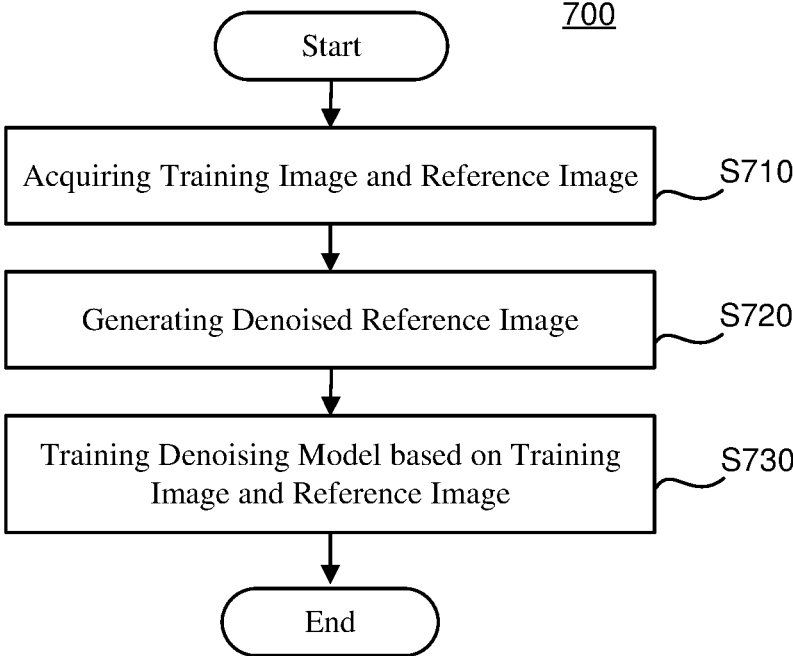
FIG. 7 is a process flowchart representing an exemplary method for training a denoising model, consistent with embodiments of the present disclosure.

FIG. 7 is a process flowchart representing an exemplary method for training a denoising model, consistent with embodiments of the present disclosure. The steps of method 700 can be performed by a system (e.g., system 300 of FIG. 3) executing on or otherwise using the features of a computing device, e.g., controller 109 of FIG. 1 for purposes of illustration. It is appreciated that the illustrated method 700 can be altered to modify the order of steps and to include additional steps.

In step S710, a training image and a reference image can be acquired. Step S710 can be performed by, for example, training image acquirer 310 or reference image acquirer 320, among others. In some embodiments, one or more inspection images for a pattern of a sample (or wafer) can be obtained as training images. In some embodiments, inspection images that have been taken for a same pattern and have different noise levels can be used as training images. In some embodiments, multiple inspection images having different noise levels can be obtained by changing average setting when taking inspection images for a pattern.

In some embodiments, a reference image can be an inspection image for a same pattern as acquired training images. In some embodiments, a reference image can be the cleanest image among multiple inspection images obtained for a pattern. In some embodiments, a reference image can also be used as training images. For example, the cleanest image, i.e., fourth inspection image 404 can be used as a reference image as well as a training image.

In step S720, a denoised reference image is generated. Step S720 can be performed by, for example, denoised reference image generator 330, among others. In some embodiments, a denoised reference image can be generated based on a reference image acquired in step S710. According to some embodiments, a denoised reference image can be generated by executing a denoising algorithm on a reference image. In some embodiments, a denoising algorithm utilized in step S720 can be a non-machine learning based denoising algorithm (non-ML based denoising algorithm). In some embodiments, a non-ML based denoising algorithm can be an algorithm that curbs noise from an image based on mathematical operations on image data. In some embodiments, a non-ML based denoising algorithm may be based on a spatial domal filtering technique, transform domain filtering technique, etc. In some embodiments, a non-ML based denoising algorithm may comprise, but is not limited to, a non-local means (NLM) algorithm, a total variation (TV) denoising algorithm, a block-matching and 3D filtering (BM3D) algorithm, a weighted nuclear norm minimization (WNNM) algorithm, wavelet denoising algorithm, etc. While it is illustrated that a denoised reference image is generated by applying a non-ML based denoising algorithm once, it will be appreciated that a denoised reference image can be generated by applying a non-ML based denoising algorithm multiple times on a reference image. According to some embodiments of the present disclosure, an iteration number of denoising operations on a reference image can be determined by considering a trade-off between image distortion and an image noise level. According to some embodiments of the present disclosure, an iteration number of denoising operations on a reference image may be determined based on a pattern of the reference image or an embodiment. In some embodiments, an iteration number of denoising operations on a reference image may be limited to two or three times because image distortion may have adverse effects if the iteration number is greater than those.

In step S730, a denoising model is trained based on an acquired training image and a denoised reference image. Step S730 can be performed by, for example, model trainer 340, among others. In some embodiments, a denoising model can be a machine learning system or neural network such as a convoluted neural network (CNN). It is appreciated that other types of machine learning systems can be utilized. In some embodiments, a training image is provided to a denoising model as an input image and processed by the denoising model to predict a denoised image corresponding to the training image. According to some embodiments of the present disclosure, a denoising model can be trained under supervised learning. In some embodiments, a denoised reference image generated in step S720 can be utilized as a ground truth reference for training a denoising model. After training a model trainer finishes, a denoising model can be outputted and can be used to predict a denoised image for an input image.

Figure 8:
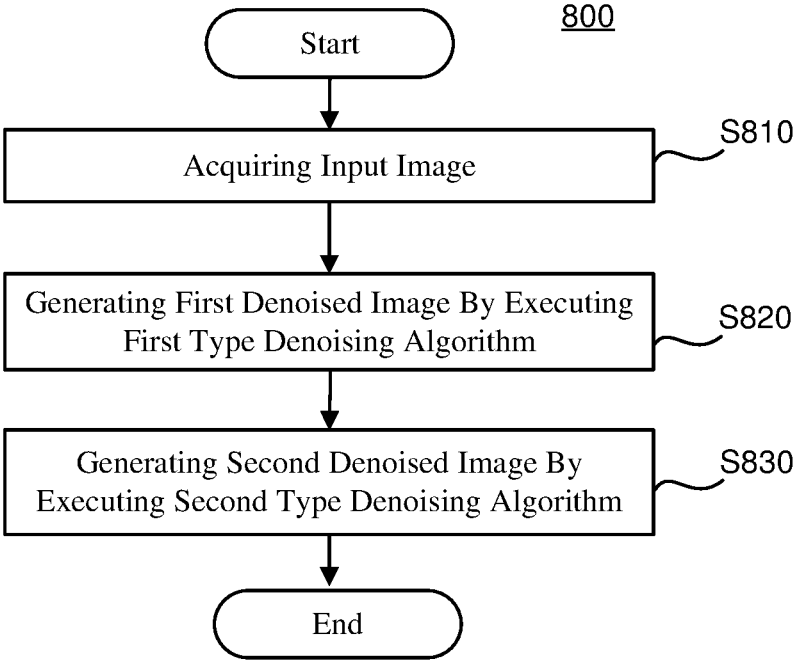
FIG. 8 is a process flowchart representing an exemplary method for denoising an inspection image, consistent with embodiments of the present disclosure.

FIG. 8 is a process flowchart representing an exemplary method for denoising an inspection image, consistent with embodiments of the present disclosure. The steps of method 800 can be performed by a denoising system (e.g., a denoising system 500 of FIG. 5) executing on or otherwise using the features of a computing device, e.g., controller 109 of FIG. 1 for purposes of illustration. It is appreciated that the illustrated method 800 can be altered to modify the order of steps and to include additional steps.

In step S810, an input image is acquired. Step S810 can be performed by, for example, input image acquirer 510, among others. In some embodiments, an inspection image can be acquired as an input image. In some embodiments, an inspection image is a SEM image of a sample or a wafer.

In step S820, a first denoised image is generated by executing a first type denoising algorithm on an input image. Step S820 can be performed by, for example, first denoiser 520, among others. In some embodiments, a first type denoising algorithm can be a machine learning based denoising algorithm (ML based denoising algorithm). In some embodiments, a first type denoising algorithm can be a machine learning model that is trained using supervised, semi-supervised, or unsupervised machine learning. In some embodiments, a machine learning model can be trained to predict a denoised image of an input inspection image. In some embodiments, a machine learning model can be trained to predict a denoised image of an input image based on hand craft features such as brightness, coordinate, etc. In some embodiments, a machine learning model can be a boosting algorithm, a multilayer perceptron (MLP) algorithm, a trainable nonlinear reaction diffusion (TNRD) algorithm, a denoising convolutional neural network (DnCNN), a very deep residual encoder-decoder (RED) network, etc. In some embodiments, a machine learning model can be trained to predict a denoised image of an input image by automatic feature learning without aid of hand craft features.

In step S830, a second denoised image is generated by executing a second type denoising algorithm on a first denoised image. Step S830 can be performed by, for example, second denoiser 530, among others. According to some embodiments, a second type denoising algorithm can be different from a first type denoising algorithm utilized in step S820. In some embodiments, a second type denoising algorithm can be a non-machine learning based denoising algorithm (non-ML based denoising algorithm). In some embodiments, a non-ML based denoising algorithm can be an algorithm that curbs noise from an image based on mathematical operations on image data. In some embodiments, a non-ML based denoising algorithm may be based on a spatial domal filtering technique, transform domain filtering technique, etc. In some embodiments, a non-ML based denoising algorithm may comprise, but is not limited to, a non-local means (NLM) algorithm, a total variation (TV) denoising algorithm, a block-matching and 3D filtering (BM3D) algorithm, a weighted nuclear norm minimization (WNNM) algorithm, wavelet denoising algorithm, etc.

While it is illustrated that a second denoised image is generated by applying a non-ML based denoising algorithm once in step S830, it will be appreciated that a second denoised image can be generated by applying a non-ML based denoising algorithm multiple times on a first denoised image. According to some embodiments of the present disclosure, an iteration number of non-ML based denoising operations on a reference image can be determined by considering a trade-off between image distortion and an image noise level. According to some embodiments of the present disclosure, an iteration number of non-ML based denoising operations on an inspection image may be determined based on a pattern of the inspection image or an embodiment. In some embodiments, an iteration number of denoising operations on an inspection image may be limited to two or three times because image distortion may have adverse effects if the iteration number is greater than those.

A non-transitory computer readable medium may be provided that stores instructions for a processor of a controller (e.g., controller 109 of FIG. 1) to carry out, among other things, image inspection, image acquisition, stage positioning, beam focusing, electric field adjustment, beam bending, condenser lens adjusting, activating charged-particle source, beam deflecting, and methods 700 and 800. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

The embodiments may further be described using the following clauses:

1. A method for generating a denoised inspection image, comprising:
  acquiring an inspection image;
  generating a first denoised image by executing a first type denoising algorithm on the inspection image; and
  generating a second denoised image by executing a second type denoising algorithm on the first denoised image.

2. The method of clause 1, wherein generating the second denoised image comprises:
  generating the second denoised image by executing the second type denoising algorithm on the first denoised image multiple times.

3. The method of clause 1 or 2, wherein the first type denoising algorithm is a machine learning (ML) based denoising algorithm.

4. The method of any one of clauses 1-3, wherein the second type denoising algorithm is a non-ML based denoising algorithm.

5. The method of any one of clauses 1-3, further comprising:
  acquiring a training image of a pattern and a reference image of the pattern;
  generating a denoised reference image by executing a non-ML based denoising algorithm on the reference image; and
  training the first type denoising algorithm to predict a denoised image of the training image based on the denoised reference image.

6. The method of clause 5, wherein generating the denoised reference image comprises:
  generating the denoised reference image by executing a non-ML based denoising algorithm on the reference image multiple times.

7. The method of clause 5 or 6, wherein training the first type denoising algorithm further comprises:
  training the first type denoising algorithm to predict denoised image of the training image using the denoised reference image as a ground truth reference.

8. An apparatus for generating a denoised inspection image, the apparatus comprising:
  a memory storing a set of instructions; and
  at least one processor configured to execute the set of instructions to cause the apparatus to perform:
    acquiring an inspection image;
    generating a first denoised image by executing a first type denoising algorithm on the inspection image; and
    generating a second denoised image by executing a second type denoising algorithm on the first denoised image.

9. The apparatus of clause 8, wherein, in generating the second denoised image, the at least one processor is configured to execute the set of instructions to cause the apparatus to further perform:
  generating the second denoised image by executing the second type denoising algorithm on the first denoised image multiple times.

10. The apparatus of clause 8 or 9, wherein the first type denoising algorithm is a machine learning (ML) based denoising algorithm.

11. The apparatus of any one of clauses 8-10, wherein the second type denoising algorithm is a non-ML based denoising algorithm.

12. The apparatus of any one of clauses 8-10, wherein the at least one processor is configured to execute the set of instructions to cause the apparatus to further perform:
  acquiring a training image of a pattern and a reference image of the pattern;
  generating a denoised reference image by executing a non-ML based denoising algorithm on the reference image; and
  training the first type denoising algorithm to predict a denoised image of the training image based on the denoised reference image.

13. The apparatus of clause 12, wherein, in generating the denoised reference image, the at least one processor is configured to execute the set of instructions to cause the apparatus to further perform:
  generating the denoised reference image by executing a non-ML based denoising algorithm on the reference image multiple times.

14. The apparatus of clause 12 or 13, wherein, in training the first type denoising algorithm, the at least one processor is configured to execute the set of instructions to cause the apparatus to further perform:
  training the first type denoising algorithm to predict the denoised image of the training image using the denoised reference image as a ground truth reference.

15. A non-transitory computer readable medium that stores a set of instructions that is executable by at least on processor of a computing device to cause the computing device to perform a method for generating a denoised inspection image, the method comprising:
  acquiring an inspection image;
  generating a first denoised image by executing a first type denoising algorithm on the inspection image; and
  generating a second denoised image by executing a second type denoising algorithm on the first denoised image.

16. The computer readable medium of clause 15, wherein, in generating the second denoised image, the set of instructions that is executable by at least one processor of the computing device cause the computing device to further perform:
  generating the second denoised image by executing the second type denoising algorithm on the first denoised image multiple times.

17. The computer readable medium of clause 15 or 16, wherein the first type denoising algorithm is a machine learning (ML) based denoising algorithm.

18. The computer readable medium of any one of clauses 15-17, wherein the second type denoising algorithm is a non-ML based denoising algorithm.

19. The computer readable medium of any one of clauses 15-17, wherein the set of instructions that is executable by at least one processor of the computing device cause the computing device to further perform:
  acquiring a training image of a pattern and a reference image of the pattern;
  generating a denoised reference image by executing a non-ML based denoising algorithm on the reference image; and training the first type denoising algorithm to predict a denoised image of the training image based on the denoised reference image.

20. The computer readable medium of clause 19, wherein, in generating the denoised reference image, the set of instructions that is executable by at least one processor of the computing device cause the computing device to further perform:

generating the denoised reference image by executing a non-ML based denoising algorithm on the reference image multiple times.

21. The computer readable medium of clause 19 or 20, wherein, in training the first type denoising algorithm, the set of instructions that is executable by at least one processor of the computing device cause the computing device to further perform:

training the first type denoising algorithm to predict the denoised image of the training image using the denoised reference image as a ground truth reference.

22. A method for training a denoising model, comprising:

acquiring a training image of a pattern and a reference image of the pattern;

generating a denoised reference image by executing a non-ML based denoising algorithm on the reference image; and training a denoising model to predict a denoised image of the training image based on the denoised reference image.

23. The method of clause 22, wherein generating the denoised reference image comprises:

generating the denoised reference image by executing a non-ML based denoising algorithm on the reference image multiple times.

24. The method of clause 22 or 23, wherein training the denoising model further comprises:

training the denoising model to predict the denoised image of the training image using the denoised reference image as a ground truth reference.

25. An apparatus for training a denoising model, the apparatus comprising:

a memory storing a set of instructions; and at least one processor configured to execute the set of instructions to cause the apparatus to perform:

acquiring a training image of a pattern and a reference image of the pattern;

generating a denoised reference image by executing a non-ML based denoising algorithm on the reference image; and training a denoising model to predict a denoised image of the training image based on the denoised reference image.

26. The apparatus of clause 25, wherein, in generating the denoised reference image, the at least one processor is configured to execute the set of instructions to cause the apparatus to further perform:

generating the denoised reference image by executing a non-ML based denoising algorithm on the reference image multiple times.

27. The apparatus of clause 25 or 26, wherein, in training the denoising model, the at least one processor is configured to execute the set of instructions to cause the apparatus to further perform:

training the denoising model to predict the denoised image of the training image using the denoised reference image as a ground truth reference.

28. A non-transitory computer readable medium that stores a set of instructions that is executable by at least on processor of a computing device to cause the computing device to perform a method for training a denoising model, the method comprising:

acquiring a training image of a pattern and a reference image of the pattern;

generating a denoised reference image by executing a non-ML based denoising algorithm on the reference image; and training a denoising model to predict a denoised image of the training image based on the denoised reference image.

29. The computer readable medium of clause 28, wherein, in generating the denoised reference image. the set of instructions that is executable by at least one processor of the computing device cause the computing device to further perform:

generating the denoised reference image by executing a non-ML based denoising algorithm on the reference image multiple times.

30. The computer readable medium of clause 28 or 29, wherein, in training the denoising model, the set of instructions that is executable by at least one processor of the computing device cause the computing device to further perform:

training the denoising model to predict the denoised image of the training image using the denoised reference image as a ground truth reference.

Block diagrams in the figures may illustrate the architecture, functionality, and operation of possible implementations of systems, methods, and computer hardware or software products according to various exemplary embodiments of the present disclosure. In this regard, each block in a schematic diagram may represent certain arithmetical or logical operation processing that may be implemented using hardware such as an electronic circuit. Blocks may also represent a module, segment, or portion of code that comprises one or more executable instructions for implementing the specified logical functions. It should be understood that in some alternative implementations, functions indicated in a block may occur out of the order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for generating a denoised inspection image, comprising:

acquiring an inspection image;

generating a first denoised image by executing a first type denoising algorithm on the inspection image, wherein the first type denoising algorithm is a machine learning (ML) model trained to predict a denoised image of a training image of a pattern using a denoised reference image generated by executing a non-ML based denoising algorithm on a reference image of the pattern; and generating a second denoised image by executing a second type denoising algorithm on the first denoised image.

2. The method of claim 1, wherein the second type denoising algorithm is a non-ML based denoising algorithm.

3. An apparatus for generating a denoised inspection image, the apparatus comprising:

a memory storing a set of instructions; and at least one processor configured to execute the set of instructions to cause the apparatus to perform:

acquiring an inspection image;

generating a first denoised image by executing a first type denoising algorithm on the inspection image, wherein the first type denoising algorithm is a machine learning (ML) denoising model trained to predict a denoised image of a training image of a pattern using a denoised reference image generated by executing a non-ML based denoising algorithm on a reference image of the pattern; and generating a second denoised image by executing a second type denoising algorithm on the first denoised image.

4. The apparatus of claim 3, wherein, in generating the second denoised image, the at least one processor is configured to execute the set of instructions to cause the apparatus to further perform:

generating the second denoised image by executing the second type denoising algorithm on the first denoised image multiple times.

5. The apparatus of claim 3, wherein the second type denoising algorithm is a non-ML based denoising algorithm.

6. The apparatus of claim 3, wherein the at least one processor is configured to execute the set of instructions to cause the apparatus to further perform:

acquiring the training image of the pattern and the reference image of the pattern;

generating the denoised reference image by executing the non-ML based denoising algorithm on the reference image; and training the first type denoising algorithm to predict the denoised image of the training image based on the denoised reference image.

7. The apparatus of claim 3, wherein at least one of the first type denoising algorithm or the second type denoising algorithm is trained by:

acquiring of a training image of a pattern and a reference image of the pattern;

generating of a denoised reference image by executing a non-ML based denoising algorithm on the reference image; and training of the first type denoising algorithm or the second type denoising algorithm to predict a denoised image of the training image based on the denoised reference image.

8. The apparatus of claim 6, wherein, in generating the denoised reference image, the at least one processor is configured to execute the set of instructions to cause the apparatus to further perform:

generating the denoised reference image by executing a non-ML based denoising algorithm on the reference image multiple times.

9. The apparatus of claim 6, wherein, in training the first type denoising algorithm, the at least one processor is configured to execute the set of instructions to cause the apparatus to further perform:

training the first type denoising algorithm to predict the denoised image of the training image using the denoised reference image as a ground truth reference.

10. A non-transitory computer readable medium that stores a set of instructions that is executable by at least on processor of a computing device to cause the computing device to perform a method for generating a denoised inspection image, the method comprising:

acquiring an inspection image;

generating a first denoised image by executing a first type denoising algorithm on the inspection image, wherein the first type denoising algorithm is a machine learning (ML) model trained to predict a denoised image of a training image of a pattern using a denoised reference image generated by executing a non-ML based denoising algorithm on a reference image of the pattern; and generating a second denoised image by executing a second type denoising algorithm on the first denoised image.

11. The non-transitory computer readable medium of claim 10, wherein, in generating the second denoised image, the set of instructions that is executable by at least one processor of the computing device cause the computing device to further perform:

generating the second denoised image by executing the second type denoising algorithm on the first denoised image multiple times.

12. The non-transitory computer readable medium of claim 10, wherein the second type denoising algorithm is a non-ML based denoising algorithm.

13. The non-transitory computer readable medium of claim 10, wherein the set of instructions that is executable by at least one processor of the computing device cause the computing device to further perform:

acquiring a training image of a pattern and a reference image of the pattern;

generating a denoised reference image by executing a non-ML based denoising algorithm on the reference image; and training the first type denoising algorithm to predict a denoised image of the training image based on the denoised reference image.

* * * * *